US006868464B2

(12) United States Patent
Levy

(10) Patent No.: US 6,868,464 B2
(45) Date of Patent: Mar. 15, 2005

(54) METHOD, APPARATUS, AND SYSTEM FOR MULTI-LINE COMMUNICATION

(75) Inventor: Paul S. Levy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 10/038,467

(22) Filed: Jan. 3, 2002

(65) Prior Publication Data

US 2003/0126331 A1 Jul. 3, 2003

(51) Int. Cl.$^7$ ............................................... G06F 13/00
(52) U.S. Cl. ..................................... 710/100; 710/107
(58) Field of Search ................................ 710/100, 305, 710/200, 107

(56) References Cited

U.S. PATENT DOCUMENTS

| | | | | | |
|---|---|---|---|---|---|
| 4,357,657 | A | * | 11/1982 | Fellinger ...................... | 710/52 |
| 4,589,063 | A | * | 5/1986 | Shah et al. ..................... | 710/8 |
| 5,089,953 | A | * | 2/1992 | Ludicky ..................... | 710/113 |
| 5,319,783 | A | * | 6/1994 | Zink et al. ..................... | 700/18 |
| 5,781,745 | A | * | 7/1998 | Ramelson et al. .......... | 710/113 |
| 5,784,636 | A | * | 7/1998 | Rupp ........................... | 712/37 |
| RE36,394 | E | * | 11/1999 | Advani et al. ............... | 710/100 |

OTHER PUBLICATIONS

NN9009390 IBM system/370 other equipment manufactures information bidirectional bus, IBM Technical Disclosure Bullentin, Sep. 1990, US.*
NN9801677 Direct Memory Access Controller Capable of Auto–Triggering the Transfer of Multiple Data Blocks, IBM Techinical Discloure Bullentin, Jan. 1, 1998.*

* cited by examiner

Primary Examiner—Tim Vo
(74) Attorney, Agent, or Firm—Blakely, Sokoloff, Taylor & Zafman LLP

(57) ABSTRACT

According to one aspect of the invention, a method is provided in which one or more requests are received to transmit data between a first device and a second device via a bus having a plurality of data lines. A first number of data lines is assigned for data transmission from the first device to the second device and a second number of data lines is assigned for data transmission from the second device to the first device, based upon a set of rules. Data are transmitted from the first device to the second device using the first number of data lines and from the second device to the first device using the second number of data lines.

9 Claims, 6 Drawing Sheets

US 6,868,464 B2

METHOD, APPARATUS, AND SYSTEM FOR MULTI-LINE COMMUNICATION

FIELD OF THE INVENTION

The present invention relates to the field of data communication and data transfer technology. More specifically, the present invention relates to a method, apparatus, and system for multi-line data communication.

BACKGROUND OF THE INVENTION

As computer devices and systems continue to advance and become more complex, effective and efficient techniques for transferring data between various components in computer systems have become more and more critical in system design and implementation. In general, it is desirable to maximize the data transfer capability between the various components such as integrated circuits (IC's) within the constraints that exist in the respective system environment. In those cases where data communication is needed in both directions, several techniques have been developed and employed to facilitate data transfer in both directions such as dedicated full-duplex (e.g., bi-directional wiring), token passing half-duplex (e.g., uni-directional wiring).

Generally, tradeoffs have been required with respect to cost and performance of various techniques or implementations. For example, in the case of full-duplex implementation, bandwidth and the associated infrastructure (e.g., pads, packages, wiring, power reserve, etc.) are underutilized when uni-directional traffic passes across the interface or bus (e.g., using only two lanes on a four-lane bridge, etc.). In the case of a dedicated uni-directional bus or interface (e.g., half-duplex), performance is sacrificed when bi-directional traffic is queued and traffic in one direction is stalled waiting for traffic in the other direction to clear (e.g., the case of one-lane bridge). Accordingly, the traditional or conventional techniques as described above are ineffective and inefficient to achieve a proper balance between performance and cost and data transfer between the various components is not optimized.

BRIEF DESCRIPTION OF THE DRAWINGS

The features of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

Figure 1:
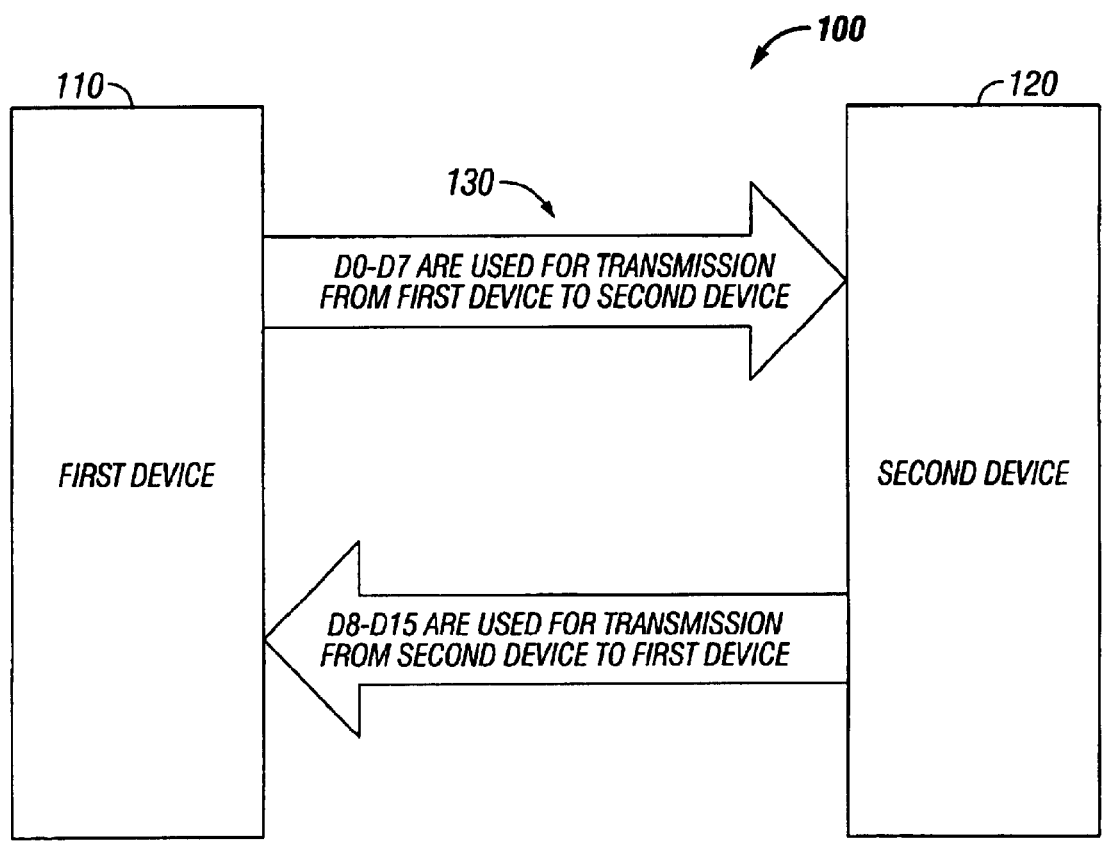
FIG. 1 shows a block diagram of a system using traditional dedicated full-duplex (bi-directional wiring) interface.

FIG. 1 shows a block diagram of a data transfer system 100 that uses a traditional dedicated full-duplex (bi-directional wiring) interface 130. As shown in FIG. 1, the full-duplex interface (also called full-duplex bus herein) 130 has a fixed number of data lines (e.g., D0–D15). Generally, in a full-duplex configuration, the data lines are split such that a fixed number of data lines (e.g., D0–D7) are configured for data transmission from the first device 110 to the second device 120 in one direction while another fixed number of data lines (e.g., D8–D15) are used for data transmission in the other direction. Such a rigid and fixed configuration often results in under-utilization of the system resources because a portion of the bus may be sitting idle if there is no traffic flowing in its direction while the other portion of the bus may be too busy handling traffic in the other direction. For example, if the first device 110 has a lot of data to transmit to the second device 120 via the full-duplex bus 130 and the second device at the moment has nothing to transmit to the first device then the portion of the bus that is reserved for data transmission from the second device to the first device (e.g., D8–D15) are sitting idle and cannot be used to accommodate the heavy traffic flowing from the first device 110 to the second device 120.

Figure 2:
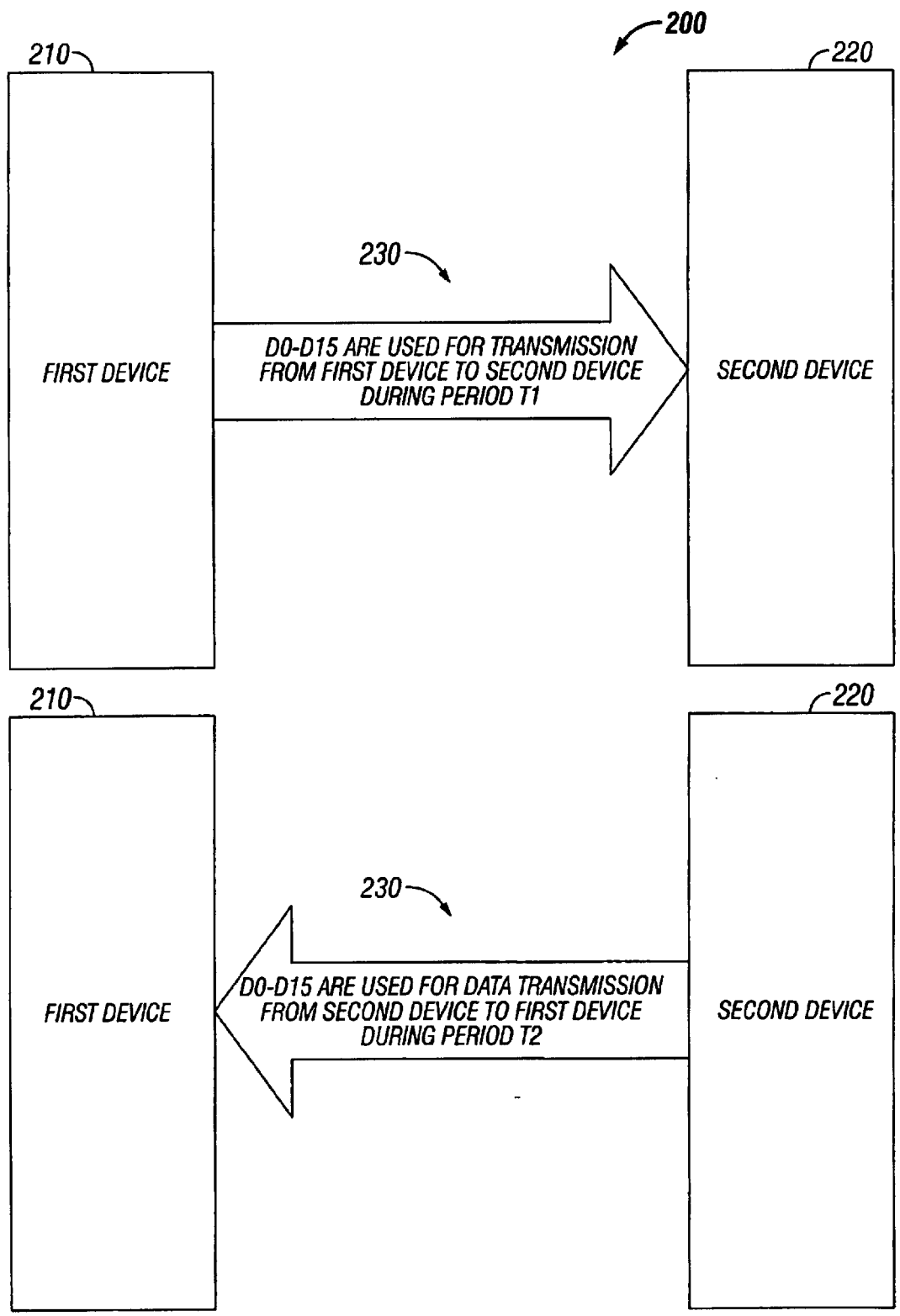
FIG. 2 is a block diagram of a system using traditional half-duplex (e.g., uni-directional wiring) interface.

FIG. 2 illustrates a block diagram of a system 200 using a traditional half-duplex (e.g., uni-directional wiring) interface 230. In the half duplex configuration, all the data lines (e.g., D0–D15) are utilized for data transmission in one direction at any given moment. For example, the data lines D0–D15 shown in FIG. 2 can be used for data transmission in one direction (e.g., from the first device 210 to the second device 220) for some duration (e.g., during period T1) and then subsequently (e.g., during period T2) can be used for data transmission in the other direction (e.g., from the second device 220 to the first device 210). Various implementations can be used to determine which device has control of the bus 230 for data transmission in its direction. However, because both devices may need to transmit data at the same time, the half-duplex configuration results in poor performance because traffic in one direction has to be stalled waiting for traffic in the other direction to clear. For example, assuming that both devices 210 and 220 want to transmit data at the same time and in this example the first device 210 currently has control of the bus 230, then the second device has to wait for the first device 210 to complete its transmission before the second device 220 can begin to transmit data to the first device 210. Accordingly, system performance in the half-duplex configuration is not optimized.

Figure 3:
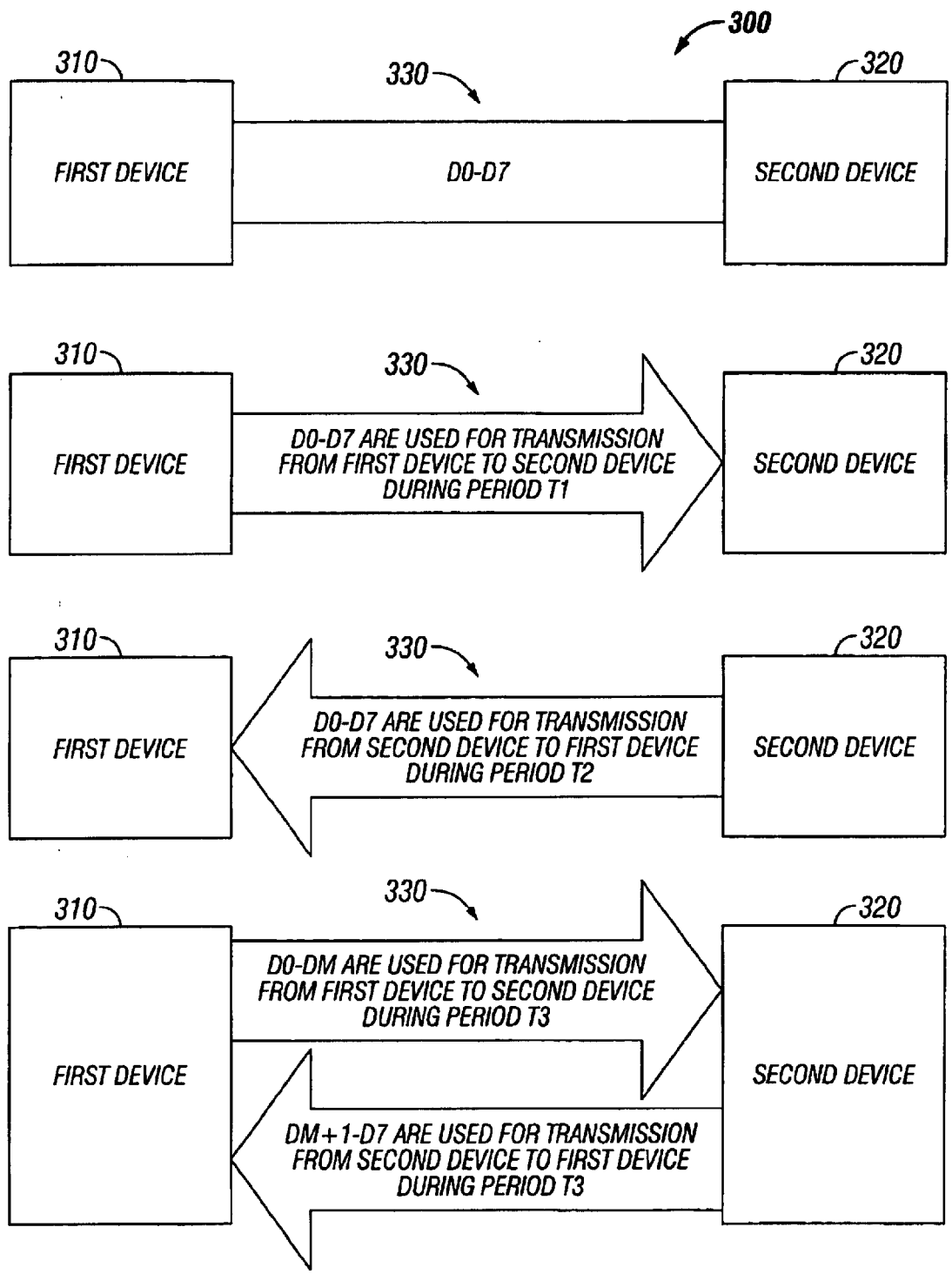
FIG. 3 illustrates a block diagram of a system in accordance with one embodiment of the present invention.

FIG. 3 illustrates a block diagram of a system 300 in accordance with one embodiment of the present invention. As shown in FIG. 3, a first device 310 and a second device 320 are coupled to transmit and receive data to/from each other via a multi-line bus (also called multi-line link) 330. In this example, the first and second devices can be integrated circuits (IC's) that are configured to transmit and receive data. It should be understood and appreciated by one skilled in the art the first and second devices can be other types of electronic devices that are capable of transmitting and receiving data. In this example, the multi-line bus 330 may contain multiple data lines (e.g., wires) each of which may be configured to transmit data in either direction. Accordingly, the multi-line buss 330 has the property to change direction on a wire by wire basis. In this example, there are 8 data lines D0–D7. In this configuration according to the teachings of the present invention, dedicated resources (e.g., pads, package, wiring, power reserve, etc.) can be maximized or optimized by matching the available communication path (e.g., the data lines) on a demand basis. For example, if the first device 310 needs to send information to the second device 320, then all data lines (D0–D7) are turned in one direction so that data can flow from the first device 310 to the second device 320 (e.g. during period T1). Similarly, if the second device 320 needs to send information to the first device 310 then all data lines D0–D7 are turned in the other direction so that data can flow from the second device 320 to the first device 310 (e.g., during period T2). However, if both the first device 310 and the second device 320 need to send information to each other at the same time then the total number of data lines can be split up such that an appropriate ratio is determined which corresponds to the demand on each side of the multi-line bus 330. For example, a number of data lines assigned for data transmission from the first device 310 to the second device 320 and a number of data lines assigned for data transmission from the second device 320 to the first device 310 can be determined to support the amount of data to be transmitted on each side. The number of data lines for each direction may be assigned based on various bases including the types of the requests, the amount of data waiting to be transmitted on each side (e.g., the depth of the queued transactions on each side), and/or priority schemes. Accordingly, in this new configuration, the number of data lines assigned for data transmission in a particular direction (e.g., from the first device 310 to the second device 320) can be set to correspond to the demand for transmitting data in that particular direction (e.g., the demand to transmit data from the first device 310 to the second device 320). As more transactions or demand exists on one side of the interface, additional data lines are turned around to support a higher volume of data flow in the corresponding direction. In this example, D0–DM (e.g., D0–D5) are used for transmission from the first device 310 to the second device 320 and DM+1–D7 (e.g., D6–D7) are used for transmission from the second device 320 to the first device 310, during period T3.

Figure 4:
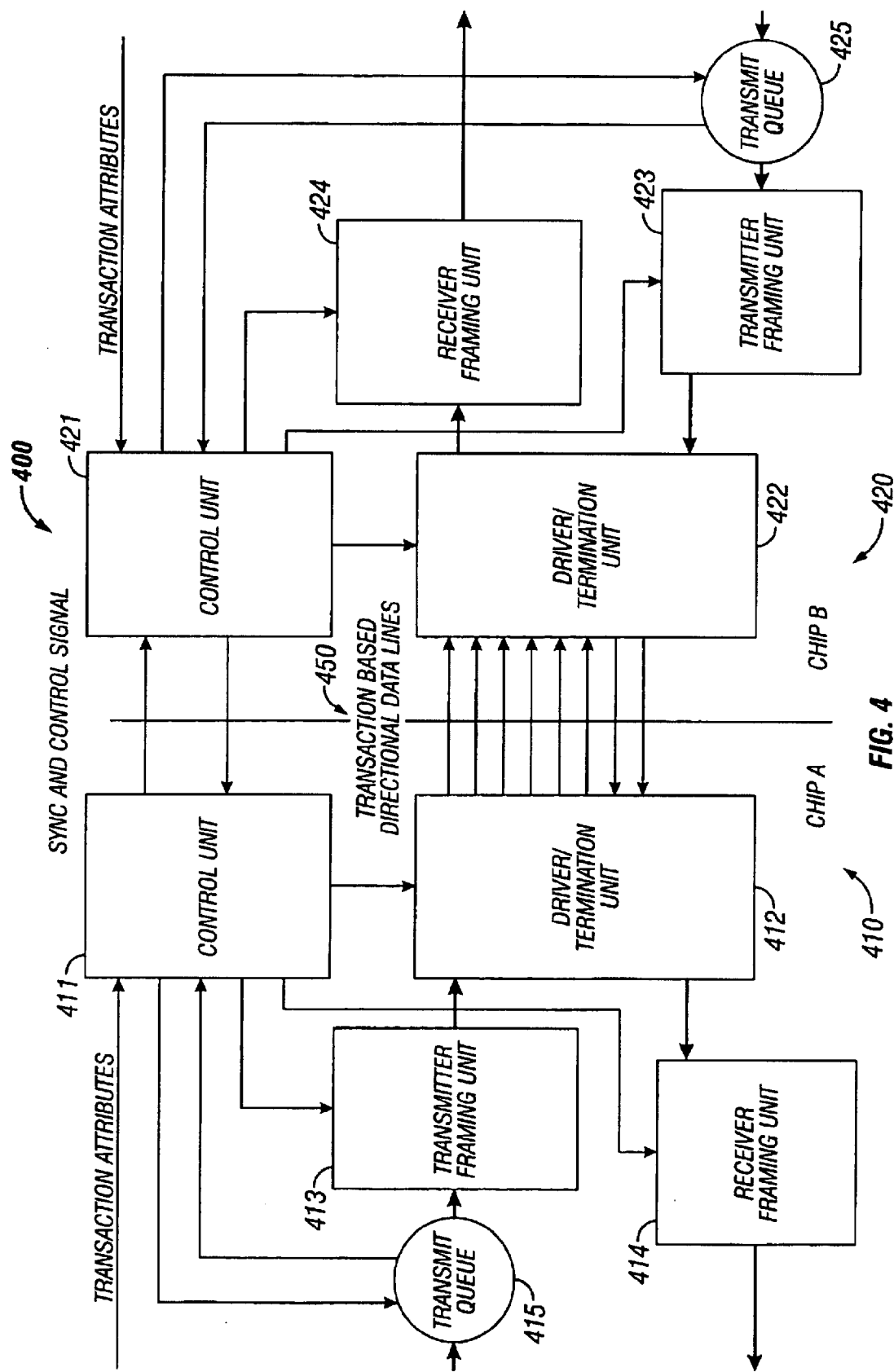
FIG. 4 shows a block a diagram of a system in accordance with one embodiment of the present invention.

FIG. 4 shows a block a diagram of a system 400 in accordance with one embodiment of the present invention. In one embodiment, the system 400 includes a first device 410 (also called chip A herein) and a second device 420 (also called chip B herein) coupled to transmit and receive data to/from each other via a multi-line link 450 (also called multi-line bus or multi-line interface herein). As shown in FIG. 4, the first device 410 includes a control unit (also called controller) 411, a driver/termination unit 412, a transmitter framing unit 413, a receiver framing unit 414, and a transmit queue 415. The second device 420 includes a control unit (also called controller herein) 421, a driver/termination unit 422, a transmitter framing unit 423, a receiver framing unit 424, and a transmit queue 425. In one embodiment, each respective transmit queue 415 and 425 is configured as a first-in-first-out (FIFO) queue containing the data to be sent across the multi-line link 450. The respective transmitter framing unit and receiver framing unit are also referred to as the transmitter and receiver, respectively, herein. In one embodiment, each respective control unit may contain a set of arbitration/load rule set for each transaction type. In one embodiment, the set of rules contained in each control unit is used to control or direct the assignment or allocation of the data lines with respect to the direction of the data transmission from each side of the multi-line link. In one embodiment, each respective control unit also is configured to generate synchronization (sync) and control signals to the other control unit on the other side of the multi-line link 450. In one embodiment, each control unit is also configured to generate clock signals to the respective transmitter and receiver on each side of the multi-line link 450. In one embodiment, each respective transmitter is configured to funnel data into the pre-selected number of data lines based on the decision by the corresponding control unit. In one embodiment, each receiver reframes the data received to the width required by the corresponding data path. In one embodiment, the transaction rules are communicated to each control unit to synchronize the behavior of the control units on both sides of the interface so that collision does not occur on the data lines. In one embodiment, each driver/termination unit contains the bi-directional signaling based on each control unit. Since both control units are synchronized, the directionality of the data lines inversely match.

In one embodiment, the set of rules to control the assignment and directionality of the data lines can be designed such that each rule has a predetermined number of data lines associated to it for data transmission from one side to the other side of the interface (also called "transmit" data lines herein). In one embodiment, to facilitate the synchronization between the control units, at any given moment, one control unit acts as a master while the other control unit acts as a slave. In one embodiment, assuming that there are n data lines to be used for data transmission between the first device 410 and the second device 420, the rules can be configured such that the master has line assignment from 0 up to n where the slave has line assignment from n down to 0. It should be understood and appreciated by one skilled in the art that the set of rules discussed herein are for illustration and explanations purposes and should not be construed to limit the scope of the present invention. Accordingly, other configurations and line assignments may be used depending upon the particular applications or implementations of the present invention. Table 1 shown below provides an example of a set of communication rules (also called bus rules or link rules herein) with the corresponding line assignments between the master and the slave in accordance with one embodiment of the present invention. In this example, it is assumed that the multi-line link 450 has eight data lines that can be used for data transmission between the first device 410 and the second device 420. It should be appreciated by one skilled in the art that the teachings of the present invention can be applied to other configurations having different number of data lines (e.g., 16, 32, 64 data lines, etc.).

TABLE 1

| Rule | Description |
| --- | --- |
| MASTER-IRQ-RULE | Master transmits on data line 0 up to data line 7 |
| MASTER-ONLY-RULE | Master transmits on data line 0 up to data line 7 |
| MASTER-75-RULE | Master transmits on data line 0 up to data line 5, Slave transmits on data line 7 down to data line 6 |
| MASTER-50-RULE | Master transmits on data line 0 up to data line 3, Slave transmits on data line 7 down to data line 4 |
| MASTER-25-RULE | Master transmits on data line 0 and data line 1, Slave transmits on data line 7 down to data line 2 |

TABLE 1-continued

| Rule | Description |
| --- | --- |
| MASTER-IDLE-RULE | Master parks the bus |
| MASTER-RELEASE-RULE | Slave parks the bus |
| SLAVE-IRQ-RULE | Slave transmits on data line 7 down to data line 0 |
| SLAVE-ONLY-RULE | Slave transmits on data line 7 down to data line 0 |
| SLAVE-75-RULE | Slave transmits on data line 7 down to data line 2, Master transmits on data line 0 up to data line 1 |
| SLAVE-50-RULE | Slave transmits on data line 7 down to data line 4, Master transmits on data line 0 up to data line 3 |
| SLAVE-25-RULE | Slave transmits on data line 7 down to data line 6, Master transmits on data line 0 up to data line 5 |
| SLAVE-IDLE-RULE | Slave parks the bus |
| SLAVE-RELEASE-RULE | Master parks the bus |
| IDLE-TO-MASTER-AND-SLAVE from Master Park | Master transmits on data line 0 up to data line 5, Slave transmits on data line 7 down to data line 6 |
| IDLE-TO-MASTER-AND-SLAVE from Slave Park | Master transmits on data line 0 up to data line 5, Slave transmits on data line 7 down to data line 6 |

In one embodiment, time synchronization and rule setting between the controllers in the system are performed during the initialization phase of the system. In one embodiment, as described above, one controller is a master with the other controller being a slave. The master-slave configuration is set up so that the rules may be passed down and the behavior of the controllers is synchronized. In one embodiment, the rules may include basic transaction watermark decision points or more complex transaction weighting schemes. In one embodiment, panic tokens may be defined that allow overriding. In the idle phase, synchronization (sync) tokens are sent from the master controller indicating a command sync token from the salve controller. This enables fast transmit requests to be recognized. In one embodiment, if both the master and the slave want to transmit at the same time (e.g., using a transmit token), the IDLE-TO-MASTER-AND-SLAVE rule is in force. If only the slave needs the bus to transmit data, the slave controller can send a SLAVE-ONLY-RULE request and the total multi-link bandwidth is assigned to the slave. In one embodiment, the rules may change on a token by token basis or on a transaction by transaction basis, depending upon the particular implementations and applications of the present invention. In one embodiment, rules may also be challenged by the other controller. Once a bus rule is active, either controller can request a rule change. It will be up the responding controller to challenge the requester, which is based on a set of predetermined criteria (also called demand rules herein) which may include various factors corresponding to the demand for data transmission on each side of the multi-link interface. In one embodiment, these various factors or criteria may include the number of pending queued transactions, the type and/or priority of the queued transactions, a pending interrupt, etc. In one embodiment, depending on the current communication rule that is active, either controller can influence a rule change. Since both controllers operate under the same rule set, there is no conflict between the controllers. In one embodiment, the controller of the transmitter needs to send its request to the receiving controller and the receiver needs to communicate its needs for the multi-line link if needed as well.

In one embodiment, data transfers between the first device and the second device are synchronized by the sync/control signal generated by each respective controller. In one embodiment, this signal is used to keep the phase lock loops in the receiver synchronized to the data stream from the transmitter. In one embodiment, command and control information may be communicated by various means such as pulse width modulation of the falling edge of the clock or token interleaving the clock, etc.

Figure 5:
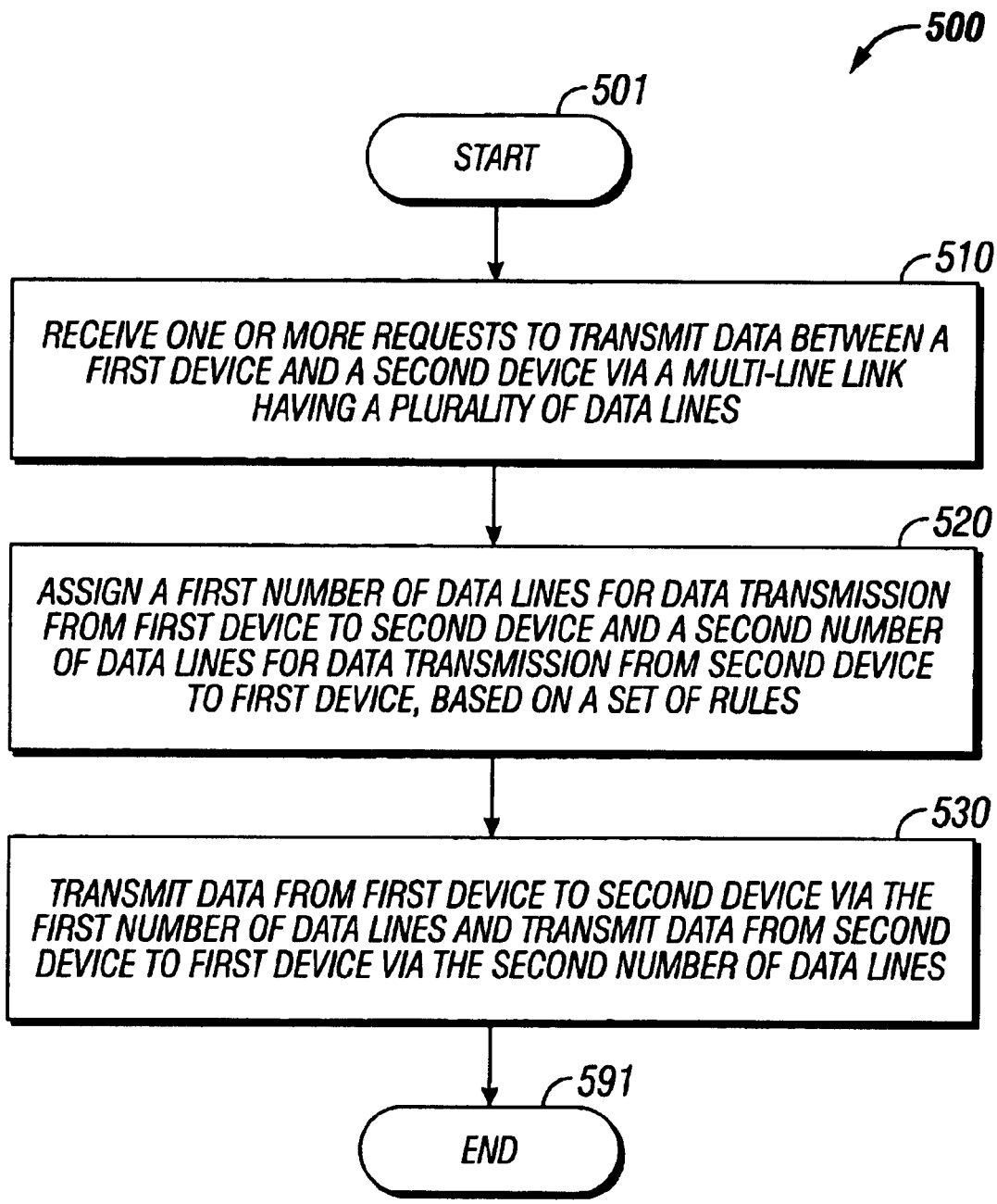
FIG. 5 shows a flow diagram of one embodiment of a method according to the teachings of the present invention.

FIG. 5 shows a flow diagram of one embodiment of a method 500 according to the teachings of the present invention. At block 510, one or more requests are received to transmit data between a first device and a second device via a bus or link having a plurality of data lines (e.g., a multi-line link). At block 520, based upon a set of rules, a first number of data lines are assigned for data transmission from the first device to the second device (e.g., the first number of data lines are turned to allow for data traffic flow from the first device to the second device) and a second number of data lines are assigned for data transmission from the second device to the first device (e.g., the second number of data lines are turned to allow for data traffic flow from the second device to the first device). At block 530, data are transmitted from the first device to the second via the first number of data lines and from the second device to the first device via the second number of data lines.

Figure 6:
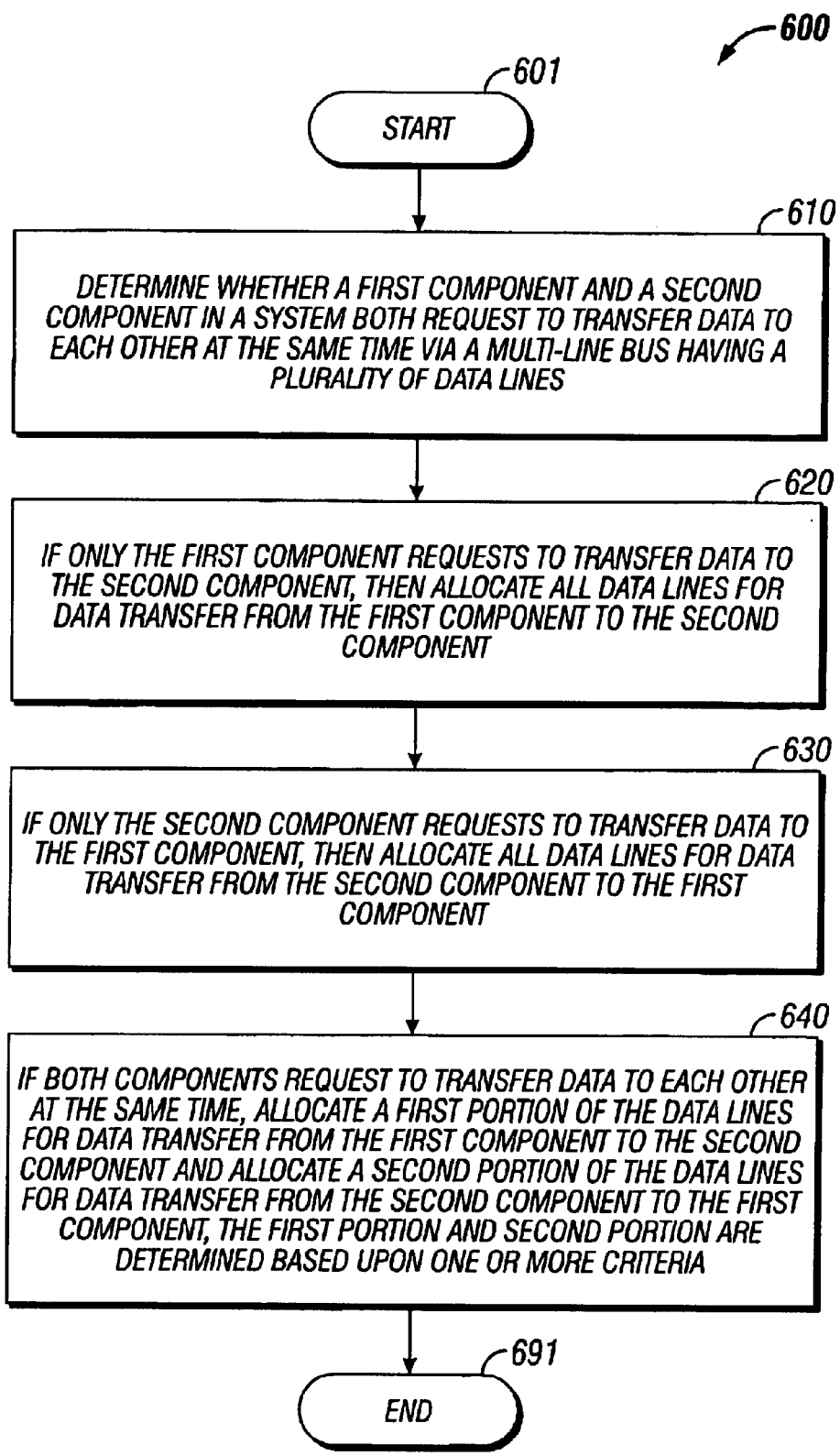
FIG. 6 shows a flow diagram of one embodiment of a method in accordance with the teachings of the present invention.

FIG. 6 shows a flow diagram of one embodiment of a method 600 in accordance with the teachings of the present invention. At block 610, it is determined whether a first component and a second component in a system both request to transfer data to each other at the same time via a bus having a plurality of data lines. At block 620, if only the first component requests to transfer data to the second component, then all of the data lines are allocated for data transfer from the first component to the second component (e.g., all data lines are turned so that data flows from the first component to the second component). At block 630, if only the second component requests to transfer data to the first component, then all data lines are allocated for data transfer from the second component to the first component. At block 640, if both the first component and the second component request to transfer data to each other at the same time, a first portion of the data lines is allocated for data transfer from the first component to the second component and a second portion of the data lines is allocated for data transfer from the second component to the first component, the first portion and the second portion are determined based upon one or more criteria.

The invention has been described in conjunction with the preferred embodiment. It is evident that numerous alternatives, modifications, variations and uses will be apparent to those skilled in the art in light of the foregoing description.

What is claimed is:

1. A system comprising:
    a first communication device including:
        a first driver; and
        a first control unit coupled to the first driver;
    a second communication device including:
        a second driver; and
        a second control unit coupled to the second driver; and
    a bus coupled to the first driver and the second driver for data transfer between the first driver and the second driver, the bus including a plurality of data lines wherein a number of data lines being assigned for data transfer in each direction varies based upon one or more criteria corresponding to a data transfer demand associated with each respective communication device, wherein the one or more criteria are selected from the group consisting of a first criterion corresponding to the type of the respective request, a second criterion corresponding to the priority of the respective request, and a third criterion corresponding to the depth of a transmit queue associated with the respective device.

2. The system of claim 1 wherein the first control unit instructs the first driver which data lines are used for data transfer from the first driver to the second driver.

3. The system of claim 1 wherein the second control unit instructs the second driver which data lines are used for data transfer from the second driver to the first driver.

4. The system of claim 1 wherein the first control unit and the second control unit cooperate to determine the direction of data transfer for each data line based upon the one or more criteria.

5. The system of claim 1 wherein the one or more criteria are used to select a particular rule from a set of predetermined rules to control the direction of each data line.

6. The system of claim 4 wherein one of the first and second control units operates as a master control unit and the other operates as a slave control unit.

7. The system of claim 5 wherein a rule change can be requested by either control unit.

8. The system of claim 7 wherein a rule change is applied on a transaction by transaction basis.

9. The system of claim 8 wherein a rule change is applied on a token by token basis.

* * * * *